US012602369B2

(12) United States Patent
Du et al.

(10) Patent No.: US 12,602,369 B2
(45) Date of Patent: Apr. 14, 2026

(54) ONLINE, EFFICIENT AND COST-OPTIMIZED DATABASE INDEX CONSISTENCY CHECKS

(71) Applicant: SAP SE, Walldorf (DE)

(72) Inventors: Shu-mu Du, Shanghai (CN); Wen-long Cao, Shanghai (CN); Tianlun Chen, Shanghai (CN); Hu Yin, Shanghai (CN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/655,499

(22) Filed: May 6, 2024

(65) Prior Publication Data

US 2025/0342147 A1     Nov. 6, 2025

(51) Int. Cl.
*G06F 16/23*          (2019.01)
*G06F 11/14*          (2006.01)
*G06F 16/22*          (2019.01)

(52) U.S. Cl.
CPC ...... *G06F 16/2365* (2019.01); *G06F 11/1402* (2013.01); *G06F 16/2255* (2019.01); *G06F 16/2272* (2019.01); *G06F 16/2379* (2019.01)

(58) Field of Classification Search
CPC ............. G06F 16/2365; G06F 16/2379; G06F 16/2272; G06F 11/1402
See application file for complete search history.

(56) References Cited

U.S. PATENT DOCUMENTS

| | | | | |
|---|---|---|---|---|
| 10,803,043 | B2 | 10/2020 | Ma et al. | |
| 10,866,971 | B2 * | 12/2020 | Bensberg | ............ G06F 16/9014 |
| 11,768,814 | B2 | 9/2023 | Ji et al. | |
| 2010/0306222 | A1 * | 12/2010 | Freedman | ........... G06F 16/9014 |
| | | | | 707/769 |
| 2015/0149472 | A1 * | 5/2015 | Lee | ...................... G06F 16/2255 |
| | | | | 707/741 |
| 2018/0253468 | A1 * | 9/2018 | Gurajada | ............ G06F 16/2255 |
| 2018/0349374 | A1 * | 12/2018 | Gurajada | ............ G06F 16/2255 |
| 2018/0349424 | A1 * | 12/2018 | Gurajada | .............. G06F 3/0604 |
| 2019/0266267 | A1 | 8/2019 | Ma et al. | |
| 2020/0349193 | A1 * | 11/2020 | Gala | .................. G06F 16/2358 |
| 2022/0004531 | A1 * | 1/2022 | Wang | .................. G06F 16/2379 |
| 2022/0382758 | A1 * | 12/2022 | Schreter | .............. G06F 16/2282 |

* cited by examiner

*Primary Examiner* — Tarek Chbouki
(74) *Attorney, Agent, or Firm* — Fish & Richardson P.C.

(57) ABSTRACT

Methods, systems, and computer-readable storage media for reading a page stored in a database system, each page storing rows of data, for a first index row of a first page, determining that the first index row is absent from being recorded in a hash table, and in response, storing a first record of the first index row in the hash table, the first record including a first hash value representative of the first index row, for a first data row of a second page, providing a second index row based on one or more values of one or more fields of the first data row, and determining that the second index row is recorded in the hash table as the first index row in the first record, and in response, removing the first record from the hash table, and outputting index consistency results based on the hash table.

20 Claims, 5 Drawing Sheets

ONLINE, EFFICIENT AND COST-OPTIMIZED DATABASE INDEX CONSISTENCY CHECKS

BACKGROUND

Database systems organize data that is stored in a database. Transactions can be executed on the data to, for example, read data from and/or write data to the database. In many cases, the database system is executed by a host, which includes a computing device in, for example, a cloud computing environment. Within a database system, data is stored in tables as records, and indexes are provided to enable rapid retrieval of data. The tables are stored in data pages that are stored in computer-readable/-writable memory.

Database consistency checks are periodically performed to examine all tables in the database and determine whether indexes and data pages are correctly linked and indexes are in the correctly sorted order. The database consistency checks also check that all pointers are consistent and that the data information on each page, and the page offsets are accurate. In general, database consistency checks enable early recognition of problems to prevent problem escalation and possible data loss. However, database consistency checks can be time- and resource-inefficient and can result in unavailability of at least some of the tables during execution.

SUMMARY

Implementations of the present disclosure are directed to database consistency checks in database systems. More particularly, implementations of the present disclosure are directed to enhancing a database storage check to execute an index consistency check that leverages a hash table to determine whether an index of a database is consistent with data stored in tables of the database.

In some implementations, actions include reading a page of a plurality of pages stored in a database system, each page storing rows of data, for a first index row of a plurality of index rows of a first page of the plurality of pages, determining that the first index row is absent from being recorded in a hash table, and in response, storing a first record of the first index row in the hash table, the first record including a first hash value representative of the first index row, for a first data row of a plurality of data rows of a second page of the plurality of pages, providing a second index row based on one or more values of one or more fields of the first data row, and determining that the second index row is recorded in the hash table as the first index row in the first record, and in response, removing the first record from the hash table, and outputting index consistency results based on the hash table. Other implementations of this aspect include corresponding systems, apparatus, and computer programs, configured to perform the actions of the methods, encoded on computer storage devices.

These and other implementations can each optionally include one or more of the following features: actions further include for a second data row of a plurality of data rows of the second page, providing a third index row based on one or more values of one or more fields of the second data row, and in response, storing a second record of the second data row in the hash table, the second record comprising a second hash value representative of the third index row; the first record includes a first-level hash key, a second-level hash key, and the first hash value; actions further include, prior to outputting the index consistency results, determining that at least one entry remains in the hash table after processing all pages of the plurality of pages, and in response, executing a retry phase to remove the at least one entry from the hash table; pages of the plurality of pages are read in allocation order as the pages are stored in computer-readable memory; the index consistency results indicate that an index of the database is consistent in response to the hash table being absent entries after processing all pages in the plurality of pages; the index consistency results indicate that an index of the database is inconsistent in response to the hash table including at least one entry after processing all pages in the plurality of pages; and the first page includes an index page and the second page comprises a data page.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
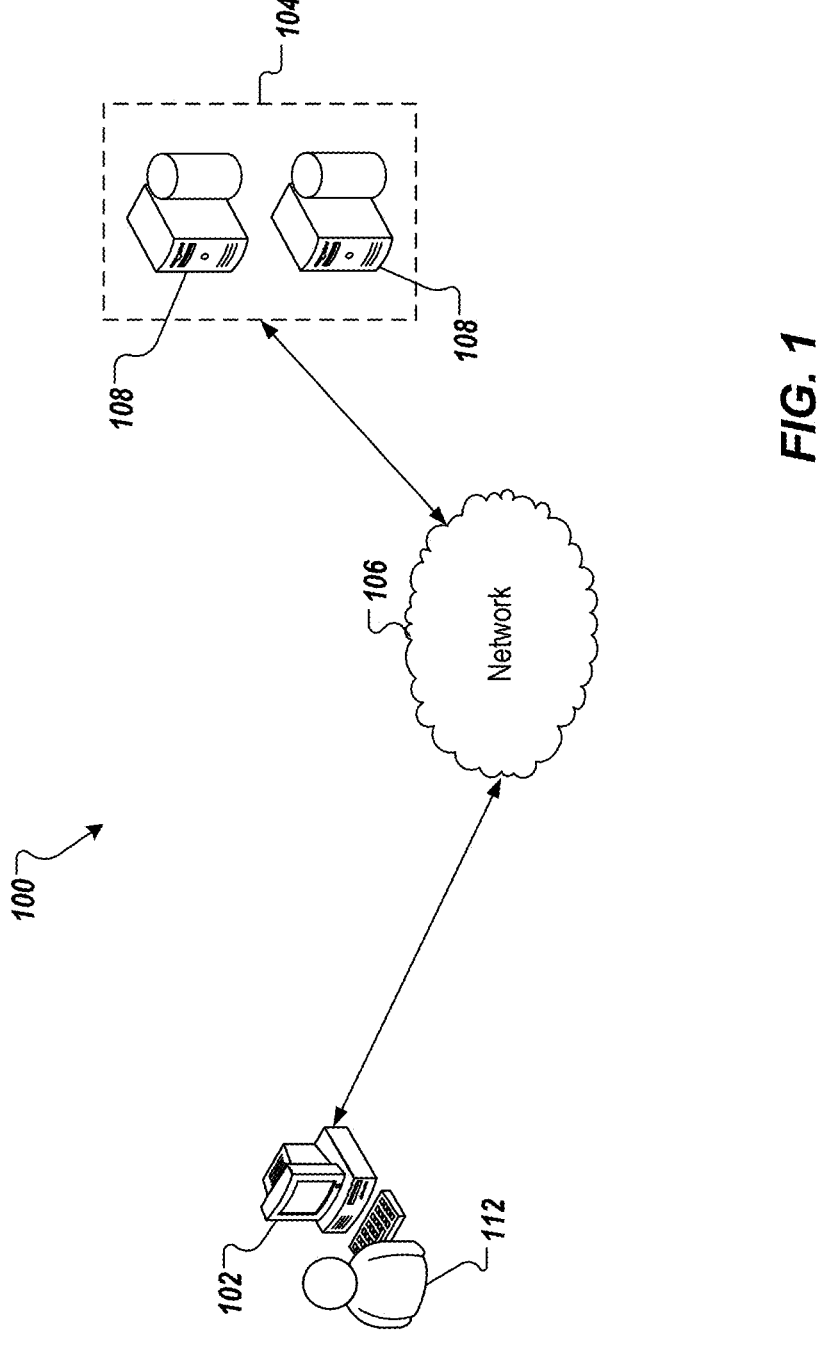
FIG. 1 depicts an example architecture that can be used to execute implementations of the present disclosure.

Implementations of the present disclosure are directed to database consistency checks in database systems. More particularly, implementations of the present disclosure are directed to enhancing a database storage check to execute an index consistency check that leverages a hash table to determine whether an index of a database is consistent with data stored in tables of the database. Implementations can include actions of reading a page of a plurality of pages stored in a database system, each page storing rows of data, for a first index row of a plurality of index rows of a first page of the plurality of pages, determining that the first index row is absent from being recorded in a hash table, and in response, storing a first record of the first index row in the hash table, the first record including a first hash value representative of the first index row, for a first data row of a plurality of data rows of a second page of the plurality of pages, providing a second index row based on one or more values of one or more fields of the first data row, and determining that the second index row is recorded in the hash table as the first index row in the first record, and in response, removing the first record from the hash table, and outputting index consistency results based on the hash table.

Implementations of the present disclosure are described in further detail herein with reference to example systems. The example systems are provided by SAP SE of Walldorf, Germany. An example system includes SAP Adaptive Server Enterprise (ASE), which can be described as a relational database management server that provides a structured query language (SQL) database and supports online transaction processing (OLTP). It is contemplated, however, that implementations of the present disclosure can be realized with any appropriate systems and are not limited to the systems specifically referenced herein.

To provide further context for implementations of the present disclosure, and as introduced above, database systems organize data that is stored in a database. Transactions can be executed on the data to, for example, read data from and/or write data to the database. In many cases, the database system is executed by a host, which includes a computing device in, for example, a cloud computing environment.

Within a database system, data is stored in tables as records. In some examples, tables are stored as data pages in memory. Example records can include records representative of people (e.g., a record including fields of name, address, telephone number, email address). Database systems use one or more indexes for efficient retrieval of data from tables. An index can be described as a sorted copy of selected database table fields. In some examples, index entries are stored as rows in index pages, where the index entries record key values and pointers to lower levels of the index, such as leaf pages, to the data pages, or to individual data rows.

In further detail, each table has a primary key that can be used to uniquely identify records within a table, where the primary keys are stored in a primary index. In the example of records representative of people, a primary key can be used to uniquely identify a person within the table (e.g., using the field of email address as the primary key). The primary key can be used to quickly find a record. In some instances, data can be retrieved from a table using a secondary index (e.g., using the field of name as a secondary key). In this manner, queries on data can be efficiently executed (e.g., find email address for all people with last name Smith). In short, indexes are used by the database system to provide fast and computationally-efficient access to data and to ensure unique constraints.

Database consistency checks are periodically performed to examine all tables in the database and determine whether the indexes and data pages are correctly linked and indexes are in the correctly sorted order. The database consistency checks also check that all pointers are consistent and that the data information on each page, and the page offsets are accurate. In general, database consistency checks enable early recognition of problems to prevent problem escalation and possible data loss.

In the non-limiting context of SAP ASE, a set of database consistency checks is provided and each can be performed by executing a respective database consistency check (dbcc) commands. Example database consistency checks include check storage executed by a dbcc checkstorage command (collectively referred to as dbcc checkstorage), check table executed by a dbcc checktable command (collectively referred to as dbcc checktable), check index executed by a dbcc checkindex command (collectively referred to as dbcc checkindex), and check database executed by a dbcc checkdb (collectively referred to as dbcc checkdb). In some examples, dbcc checkstorage runs checks against the database on disk (long-term storage) and, among other things, checks location of text valued columns, page allocation and consistency, pointer consistency, and text-valued columns and text-column chains. In some examples, dbcc checktable performs a series of checks on a specified table and, among other things, checks that the index and data pages are correctly linked, indexes are properly sorted, pointers are consistent, and all indexes and data partitions are correctly linked. In some examples, dbcc checkindex runs the same checks as dbcc checktable, but only on a specified index instead of the entire table. In some examples, dbcc checkdb runs the same checks as dbcc checktable on each table in a specified database.

However, as the amount of data stored in a database becomes larger, performance of database consistency checks decreases. That is, database consistency checks can be inefficient in terms of time and computational resources consumed to execute the checks. Further, concurrent data manipulation language (DML) statements (e.g., INSERT, UPDATE, DELETE) can be blocked. That is, use of at least a portion of a database can be prohibited during execution of a database consistency check. Different database consistency checks have different performance characteristics. For example, and in the example context of SAP ASE, Table 1 depicts performance comparisons for dbcc checkdb and dbcc checkstorage across different database sizes:

TABLE 1

| Consistency Check Performance Comparison | | | |
| --- | --- | --- | --- |
| | DB Size = 23 G (47 devices, 37 workers) | DB Size = 280 G (47 devices, 42 workers) | DB Size = 912 G (47 devices, 37 workers) |
| checkdb | 61 min | 703 min≈11 hrs | 1746 min≈29 hrs |
| checkstorage | 14 min | 54 min | 102 min |

As depicted in the example of Table 1, dbcc checkstorage spends about ¼~¹⁄₁₀ time than that of dbcc checkdb. Consequently, dbcc checkstorage consumes less technical resources than dbcc checkdb. It is also seen that the time spent by dbcc checkdb is linear with the size of database, while the time spent by checkstorage is not linear with the size of the database. As such, the improved performance of dbcc checkstorage over dbcc checkdb is even more pronounced as the size of the database increases. However, and as noted above, dbcc checkdb is executed to check that the index and data pages are correctly linked across all tables in the specified database. That is, in order to perform consistency check of the indexes and data pages, a lower performing database consistency check is executed.

In view of the above context, implementations of the present disclosure provide for enhanced functionality of a higher performing database consistency check in a set of database consistency checks. More particularly, implementations of the present disclosure enhance a check storage consistency check (disk storage) to include an index consistency check. The index consistency check is executed to ensure an order of index keys (e.g., primary keys) and their identifier list in pages. For example, for each identifier in a leaf page, it is determined whether the corresponding row number exists in a data page and it is verified that the index columns in the data row match the key in the leaf page.

In the example context of SAP ASE, implementations of the present disclosure enhance dbcc checkstorage to execute all of the functions of dbcc checkdb, which includes an index consistency check. In this manner, dbcc checkstorage can be executed instead of dbcc checkdb to improved performance of database consistency checking in terms of both time and technical resources (processors, memory) consumed. More particularly, implementations of the present disclosure add a parameter to dbcc checkstorage that enables dbcc checkstorage to execute an index consistency check and a sort order check. By adding index consistency check and sort order check, dbcc checkstorage can cover all of the checks traditionally executed by dbcc checkdb (or dbcc checktable) and provide technical efficiencies due to the better performance of dbcc checkstorage. Hence, when executing dbcc checkstorage with index consistency check and sort order check on large database (>100 G), the performance is improved over dbcc checkdb. In some implementations, the parameter is not enabled by default. This enables any potential negative effect on existing users to be avoided.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In some implementations, the server system 104 can host a database system. For example, the server system 104 can host a relational database management server that provides a SQL database for OLTP transactions, such as in the example context of SAP ASE. In accordance with implementations of the present disclosure, a set of database consistency checks can be provided and can include an enhanced database consistency check, as described in further detail herein.

As introduced above, implementations of the present disclosure enhance dbcc checkstorage with a parameter, with_index, which enables dbcc checkstorage to execute index consistency and index sort order checks and report any index-related faults. Otherwise, the default behavior of dbcc checkstorage does not change. An example syntax for dbcc checkstorage can be provided as:

dbcc checkstorage[(dbname [, with_index])]

In accordance with implementations of the present disclosure, the database consistency check is executed in multiple phases, which include an initialization phase, a scanning phase, and a retry phase. In some instances, the retry phase is only executed when there is a potential inconsistency detected in the scanning phase.

During the initialization phase, a separate memory space is reserved as a temporary database (e.g., a dbcc database (dbccdb) to store data pages during the scan phase. The temporary database is not accessible to users. In this manner, DML statements are not executed on data of the temporary database during execution of the database consistency check. A set of threads are booted up to execute the database consistency check. In some examples, a thread is provided for each device that stores data. To illustrate this, a non-limiting example can be considered, in which a database is built across 10 devices (e.g., 10 disks), where disks can be of different sizes. In this example, 10 threads are provided, one thread for each device. In some examples, metadata is provided in the initialization phase, which describes indexing used to generate the primary index.

During the scan phase, the database consistency check sequentially reads batches of data pages into the temporary database, performs checks as described herein, and removes the data pages for the next batch. In this manner, not all data pages are stored in the temporary databases, which enables the temporary database to be significantly smaller than the database in terms of memory. In further detail, the data pages of the database are read in allocation order, which is the order in which the data pages are stored in computer-readable memory. This is more computationally-efficient than other approaches, such as by following page links and reading data pages in essentially random order. Because the data pages are read in allocation order, relationships of data rows and index rows cannot be immediately validated while being processed. To resolve this issue, implementations of the present disclosure introduce hash tables to store information of data rows and index rows that are read during the scan phase.

More particularly, and as described in further detail herein, when a data row is read, a corresponding index row is generated for each index of the table, and a hash value is computed for each index row. Here, the hash value represents a compressed identifier of a respective index row. In some examples, the index row is generated by a call to an index service (e.g., through an application programming interface (API)), which returns the index row for the data row. Here, the index service generates the index row using the same indexing strategy used for the database. If there is no entry for the index row in the hash table, the hash value is directly inserted into to the hash table. If there is an existing entry for the index row in the hash table, the entry is removed from the hash table. When reading an index row, the hash value for the index row is computed. If there is no entry for the index row in the hash table, the hash value is directly inserted into the hash table. If there is an existing entry for the index row in the hash table, the computed hash value is compared to the hash value stored in the hash table. If the hash values match, the entry is removed from the hash table. If the hash values do not match, the entry remains in the hash table. Mismatched hash values can occur because, for example, there is a data corruption, or one or more concurrent DMLs have changed the data row and/or the index row.

After scanning all database pages of the database, if the database is data consistent, the hash table should have no remaining entries. That is, all entries added to the hash table should have been removed from the hash table during scanning. If, on the other hand, entries remain in the hash table, the database can be considered as not being data consistent. This can occur, for example, because data rows and/or index rows are actually absent in the database and/or concurrent DMLs affect the scanning phase of execution of database consistency check. If entries remain in the hash table, a retry phase is executed to mitigate any false alerts. In some implementations, the retry phase is executed over the actual database instead of the separate memory space (e.g., the dbccdb). Because the remaining entries will be representative of relatively few index rows and/or data rows, use of the actual database will not appreciably impact user access to the actual database.

In some examples, for each remaining entry, if the entry is for a data row, the corresponding index row is generated and it is determined whether the index row exists in the index. If the entry is for an index row, it is determined whether the corresponding data row exists and has exactly the same hash value of index columns. If, in either case, the corresponding row is found, a false alert is indicated and the entry is deleted from the hash table. If, however, the corresponding row is not found, a table lock on the corresponding database table is acquired and another attempt is made to find the corresponding row. If it is again determined that the corresponding row does not exist, a true fault is reported.

As introduced above, implementations of the present disclosure leverage hash tables to store information when scanning a data row or an index row and index consistency checks are executed against the hash tables. For each data row or index row, a row identifier (RID) and a hash value are stored in a hash node. In some examples, the row identifier is used to determine whether the index row points to a correct data row and is also used in the retry phase, if needed, to avoid false faults. In some examples, the hash value is a 4-byte integer containing 32 bits that is calculated based on all index columns of a respective row. Here, the hash value can be thought of as a compressed identifier of index columns for an index row. In some examples, a tailing bit of the hash value is overridden to identify whether the hash value is generated for a data row or an index row (e.g., the last bit is set to 0 for a data row or is set to 1 for an index row). In some implementations, during scanning, no matter whether a data row or an index row, the information generated in a hash node should be same (except the tailing bit in hash value) and will be hashed into a same hash bucket, discussed in further detail below. Consequently, when a corresponding index row or data row is scanned, it can be directly determined whether the generated information is the same.

Figure 2:
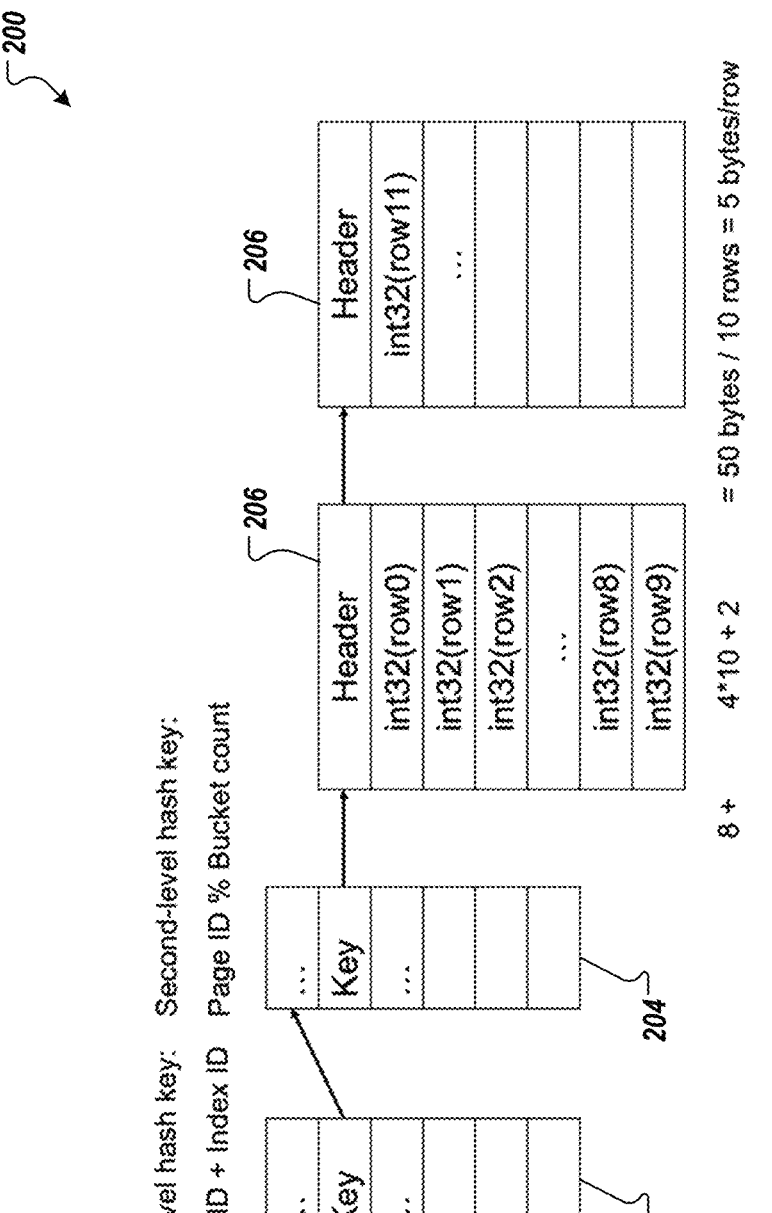
FIG. 2 depicts an example multi-level hash table in accordance with implementations of the present disclosure.

FIG. 2 depicts an example multi-level hash table 200 in accordance with implementations of the present disclosure. In the depicted example, the multi-level hash table 200 includes a first-level hash key set 202, a second-level hash key set 204, and multiple hash nodes 206. In some examples, for each index row, a first-level hash key is calculated based on an object identifier (Object ID) and an index identifier (Index ID) and is inserted into the first-level hash key set 202. In some examples, the first-level hash key is generated by concatenating the object identifier and the index identifier. In some examples, the concatenation of the Object ID and Index ID is processed through a hash function to provide the first-level hash key. Object ID is the identifier of table and Index ID is the identifier of index for the table.

In some examples, the second-level hash key is generated by a hash function provided as page identifier modulo bucket count. For purposes of illustration, a non-limiting example can be considered, in which a bucket count is set to 100 and an RID (801, 3) is to be inserted into the hash table. In this example, 801 is the page identifier and 3 is an offset. In this example, the second-level hash key is calculated as 801% 100=1, where % represents a modulo operation. In the hash bucket, 10 rows are stored together in one hash node. For RID (801, 3) the int32 will be stored in offset 3 and a multiplier 8 will be stored in header. Here, in this example, RID (801, 3), 801 is the page ID and 3 is the third row on this page. In one hash node, 10 hash values (for 10 rows) are stored together. As a result, for the third row, it's hash value is stored in the third slot, providing the offset of 3. In some examples, the multiplier, 8 in this example, used to store in header of this hash node. Because later in retry phase, if this entry is remaining in this hash table, the original RID of this row is to be determined. Accordingly, and for this example, the page ID is equal to 8 (multiplier)*100 (bucket count)+1 (hash key)=801, row id=3 (offset of this hash node). In this manner, the RID for each row need not be stored, the page part is replaced by the hash key and header, and the row part is replaced by offset. This reduces memory consumption during the database consistency check. For example, for a 10,000,000-row table, only approximately 47 MB of memory is consumed.

In some implementations, values in the respective rows are processed through a hash function to generate a hash value. In some examples, the hash value is provide as a 32-bit integer (int32). An example hash function can include, but is not limited to, the Jenkins-Hash. For example, for an index row, values across all fields of the index row are concatenated and the concatenation is processed through the hash function to provide the hash value.

Figure 3A:
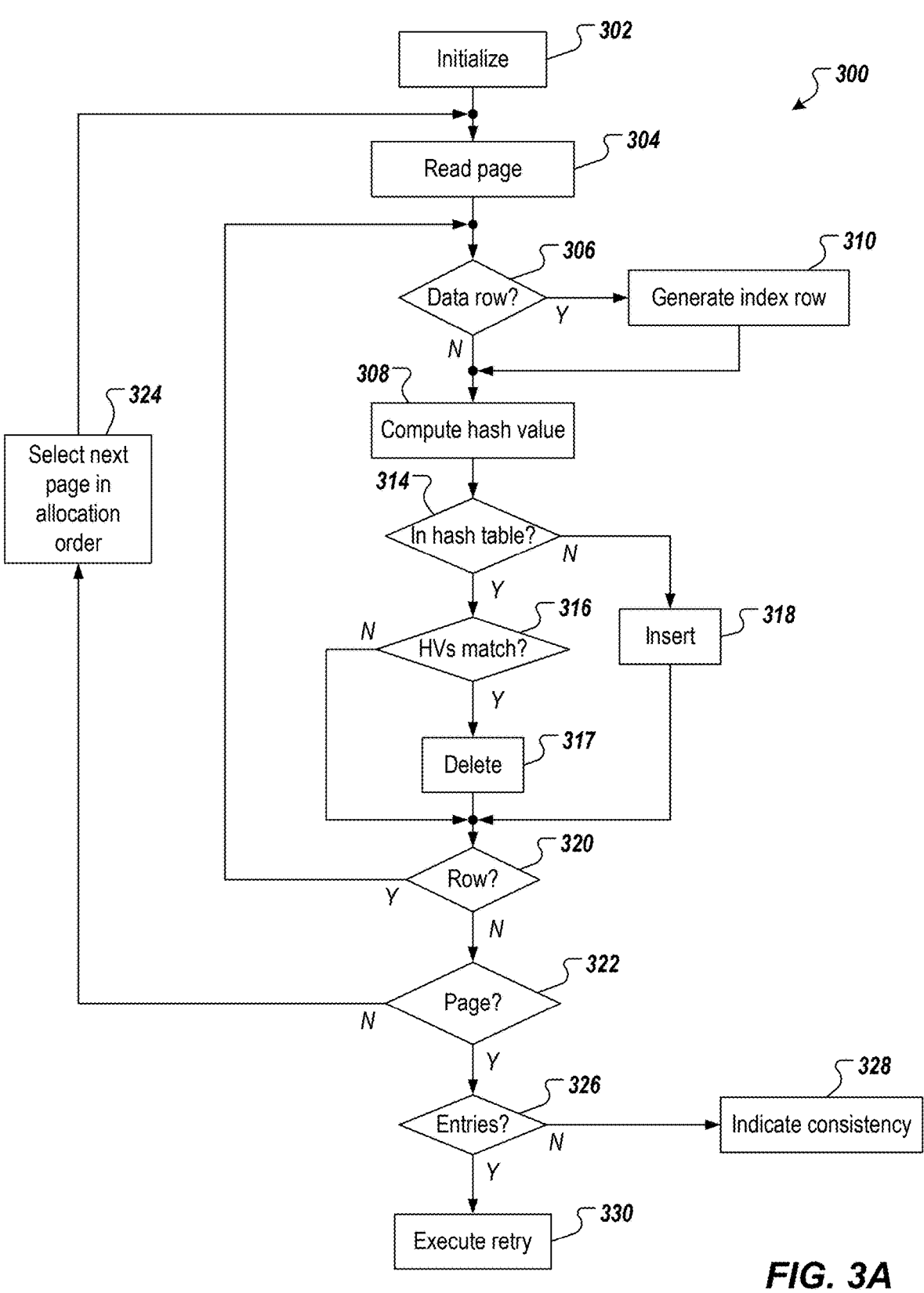
FIGS. 3A and 3B depict example processes that can be executed in accordance with implementations of the present disclosure.

FIG. 3A depicts an example process 300 that can be executed in accordance with implementations of the present disclosure. In some examples, the example process 300 is provided using one or more computer-executable programs executed by one or more computing devices.

The database consistency check is initialized (302). For example, and as described herein, a temporary database is provided, from which pages are read, and a set of threads are booted up to execute the database consistency check. A page is read (304). For example, and as described herein, a page is read from disk-based storage in the allocation order that the pages were stored in memory. That is, the first page stored on disk is read first. In some examples, each page is read into a buffer for processing by a thread. It is determined whether a current row that is being considered is a data row (306). For example, for each page, rows are read in order.

If the current row being considered is not a data row, a hash value is computed (308). For example, and as described herein, if the row currently being considered is not a data row, it is an index row and a hash value is computed for the index row. In some examples, computing the hash value includes processing (e.g., concatenated) values of fields of the index row through a hash function. In some examples, a first-level hash key and a second-level hash key are also determined for the index row. If the current row being considered is a data row, an index row is generated for the data row (310) and a hash value is computed (308). For example, and as described herein, the index row is generated by a call to an index service (e.g., through an API), which returns the index row for the data row. Here, the index service generates the index row using the same indexing strategy used for the database. For example, the call can include values of fields of the data row and the index row that is returned can include one or more fields and respective values of the data row.

It is determined whether an entry for the index row is included in the hash table (314). For example, and as described herein, the hash table can be scanned to determine whether an entry is present in the hash table for the index row. In some examples, the first-level hash key and the second-level hash key are used as indexes to the hash table to determine whether an entry for the index row is present (e.g., if the first-level hash key is in the first-level hash key set and points to the second-level hash key in the second-level hash key set, it is determined that an entry is present).

If an entry for the index row is included in the hash table, it is determined whether the computed hash value and the stored hash value (collectively, hash values (HVs) are the same (316). If the hash values are the same, the entry is deleted from the hash table (317). If the hash values are not the same, the entry remains in the hash table. If an entry for the index row is not included in the hash table, an entry for the index row is inserted into the hash table (318). For example, and as described herein, the hash value determined for the index row is inserted into a hash node of the hash table. In some examples, the first-level hash key and the second-level hash key are used to index the hash value that is inserted into the hash table.

It is determined whether one or more rows remain to be read in the current page being considered (320). If one or more rows remain, the example process 300 loops back to consider the next row in the page. If no rows remain (all rows of the page being considered have been processed), it is determined whether one or more pages remain to be read (322). If one or more pages remain, a next page in the allocation order is selected (324) and the example process 300 loops back to process the rows of the selected page.

If no pages remain (all pages of the database have been processed), it is determined whether any entries remain in the hash table (326). If no entries remain in the hash table, consistency of the index is indicated (328). For example, a flag can be set to a value indicating consistency of the index and the flag can be returned as part of a results set of the database consistency check. If one or more entries remain in the hash table, retry is executed (330), as described in further detail herein with reference to FIG. 3B. For example, and as described in detail herein, remaining entries each indicate a potential inconsistency that is checked during the retry.

Figure 3B:
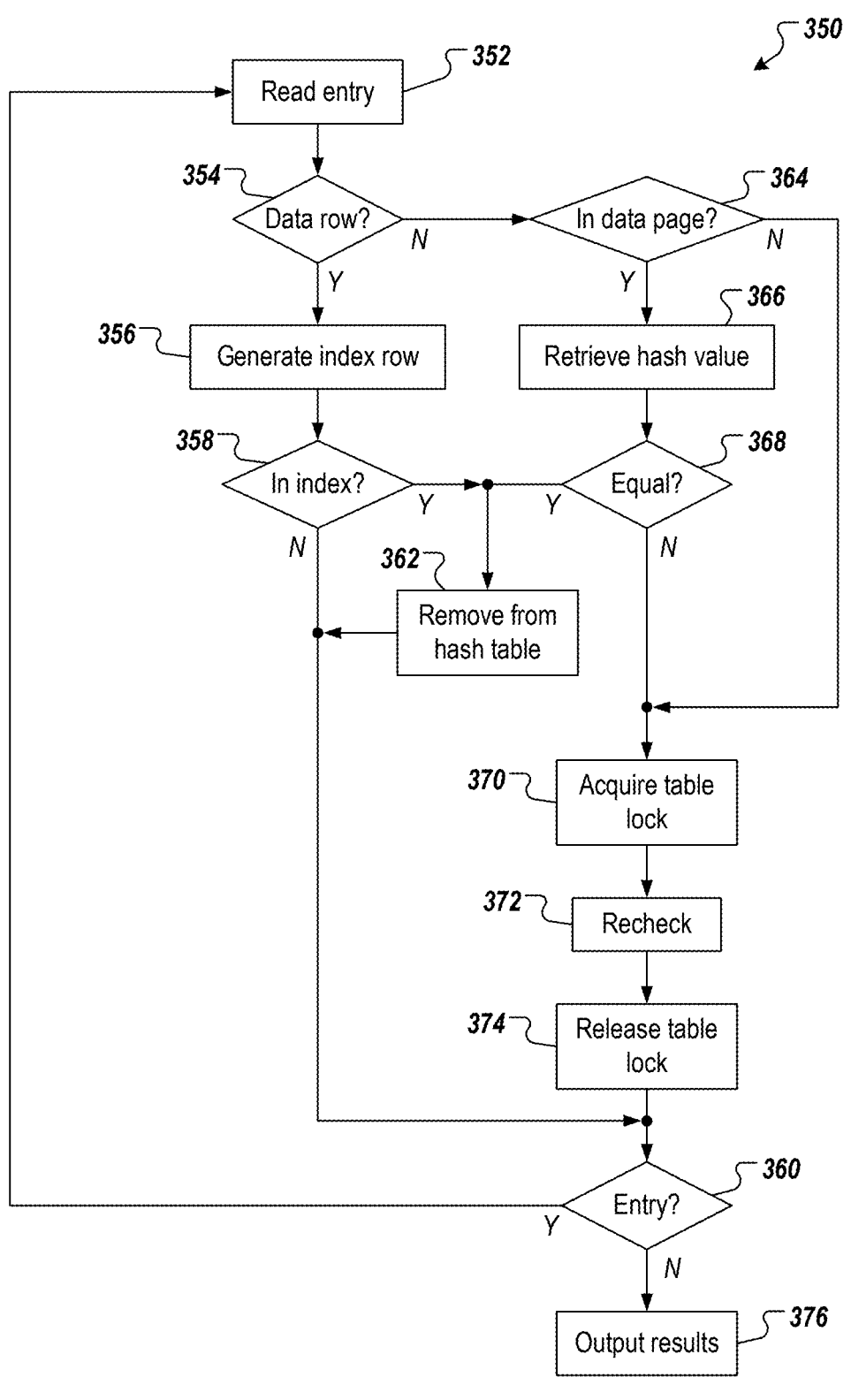

FIG. 3B depicts an example process 350 that can be executed in accordance with implementations of the present disclosure. In some examples, the example process 350 is provided using one or more computer-executable programs executed by one or more computing devices. In some examples, the example process 350 represents execution of a retry phase. In some examples, the example process 350 executes over data stored in the actual database (i.e., instead of the temporary database).

An entry in the hash table is read (352) and it is determined whether the entry is for a data row (354). If the entry is for a data row, an index row corresponding to the data row is generated (356). For example, and as described herein, the index row is generated by a call to an index service (e.g., through an API), which returns the index row for the data row. Here, the index service generates the index row using the same indexing strategy used for the database. For example, the call can include values of fields of the data row and the index row that is returned can include one or more fields and respective values of the data row. It is determined whether the index row is in the index (358). For example, the index of the actual database is searched to determine whether the index row is present in the index. If the index row is not present in the index, it is determined whether there is another entry in the hash table that is to be retried (360). If the index row is present in the index, the entry is removed from the hash table (362).

If the entry is not for a data row, the entry is for an index row and it is determined whether a data row corresponding to the index row is present in the corresponding data page (364). If the data row is present in the corresponding data page, the hash value for the data row is retrieved (366). It is determined whether the hash value is equal to the hash value of the entry of the index row as stored in the hash table (368). If equal, the entry is removed from the hash table (362).

If the data row is not present in the corresponding data page or the hash values are not equal, a lock is acquired on the table corresponding to the data page (370). In this manner, DML statements cannot be executed on the table in the actual database. A recheck is executed (372). For example, the database is checked to determine whether the data row corresponding to the index row is present in the database and, if so, whether the hash values are equal. If so, the entry is removed from the hash table. If not, the entry remains in the hash table. The lock on the table is released (374) and it is determined whether there is another entry in the hash table that is to be retried (360). If there is another entry in the hash table that is to be retried, the example process 350 loops back.

If there is not another entry in the hash table that is to be retried, results are output (376). In some examples, if all entries in the hash table have been removed through the example process 350, the results indicate consistency of the index. In some examples, if any entries remain in the hash table, the results indicate inconsistency of the index. Further, for each inconsistency, the particular index row and/or data row can be identified in the results.

Figure 4:
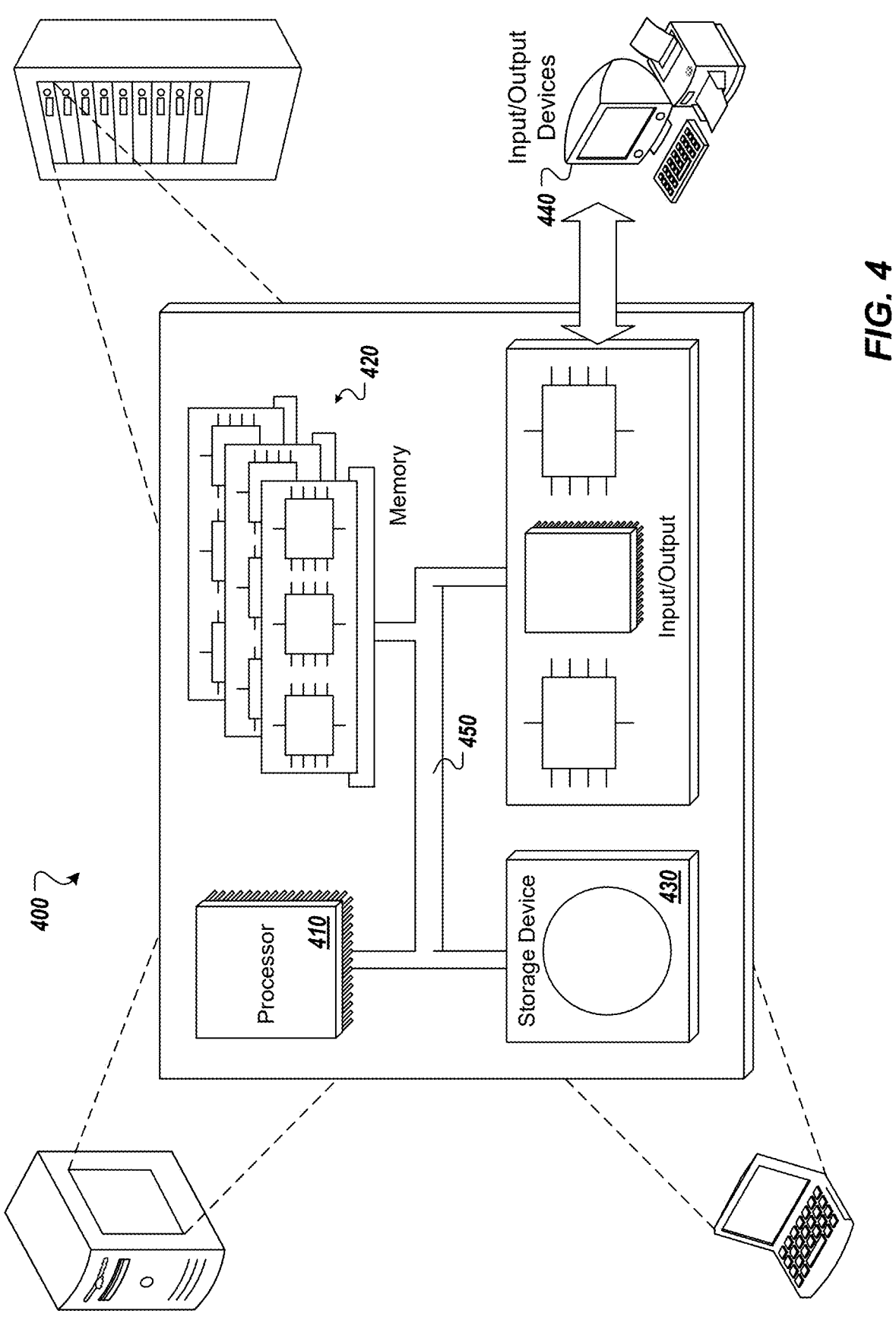
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. The components 410, 420, 430, 440 are interconnected using a system bus 450. The processor 410 is capable of processing instructions for execution within the system 400. In some implementations, the processor 410 is a single-threaded processor. In some implementations, the processor 410 is a multi-threaded processor.

The processor 410 is capable of processing instructions stored in the memory 420 or on the storage device 430 to display graphical information for a user interface on the input/output device 440.

The memory 420 stores information within the system 400. In some implementations, the memory 420 is a computer-readable medium. In some implementations, the memory 420 is a volatile memory unit. In some implementations, the memory 420 is a non-volatile memory unit. The storage device 430 is capable of providing mass storage for the system 400. In some implementations, the storage device 430 is a computer-readable medium. In some implementations, the storage device 430 may be a floppy disk device, a hard disk device, an optical disk device, or a tape device. The input/output device 440 provides input/output operations for the system 400. In some implementations, the input/output device 440 includes a keyboard and/or pointing device. In some implementations, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for database consistency checks in database systems, the method being executed by one or more processors and comprising:

reading a page of a plurality of pages stored in a database system, each page storing rows of data;

for a first index row of a plurality of index rows of a first page of the plurality of pages, determining that the first index row is absent from being recorded in a multi-level hash table, and in response:

storing a first record of the first index row in the multi-level hash table, the first record comprising a first hash value representative of the first index row, the first hash value being determined through hashing using an object identifier that identifies a table and an index identifier that identifies an index of the table, the first hash value pointing to a second hash value determined through hashing a page identifier based on a bucket count;

for a first data row of a plurality of data rows of a second page of the plurality of pages:

providing a second index row based on one or more values of one or more fields of the first data row, and determining that the second index row is recorded in the hash table as the first index row in the first record, and in response:

removing the first record from the hash table; and outputting index consistency results based on the hash table.

2. The method of claim 1, further comprising:

for a second data row of a plurality of data rows of the second page:

providing a third index row based on one or more values of one or more fields of the second data row, and in response:

storing a second record of the second data row in the hash table, the second record comprising a third hash value representative of the third index row.

3. The method of claim 1, wherein the first record comprises a first-level hash key, a second-level hash key, and the first hash value.

4. The method of claim 1, further comprising, prior to outputting the index consistency results, determining that at least one entry remains in the hash table after processing all pages of the plurality of pages, and in response:

executing a retry phase to remove the at least one entry from the hash table.

5. The method of claim 1, wherein pages of the plurality of pages are read in allocation order as the pages are stored in computer-readable memory.

6. The method of claim 1, wherein one of:

the index consistency results indicate that an index of the database is consistent in response to the hash table being absent entries after processing all pages in the plurality of pages; and the index consistency results indicate that an index of the database is inconsistent in response to the hash table comprising at least one entry after processing all pages in the plurality of pages.

7. The method of claim 1, wherein the first page comprises an index page and the second page comprises a data page.

8. A non-transitory computer-readable storage medium coupled to one or more processors and having instructions stored thereon which, when executed by the one or more processors, cause the one or more processors to perform operations for database consistency checks in database systems, the operations comprising:

reading a page of a plurality of pages stored in a database system, each page storing rows of data;

for a first index row of a plurality of index rows of a first page of the plurality of pages, determining that the first index row is absent from being recorded in a hash table, and in response:

storing a first record of the first index row in the hash table, the first record comprising a first hash value representative of the first index row, the first hash value being determined through hashing using an object identifier that identifies a table and an index identifier that identifies an index of the table, the first hash value pointing to a second hash value determined through hashing a page identifier based on a bucket count;

for a first data row of a plurality of data rows of a second page of the plurality of pages:

providing a second index row based on one or more values of one or more fields of the first data row, and determining that the second index row is recorded in the hash table as the first index row in the first record, and in response:

removing the first record from the hash table; and outputting index consistency results based on the hash table.

9. The non-transitory computer-readable storage medium of claim 8, wherein operations further comprise:

for a second data row of a plurality of data rows of the second page:

providing a third index row based on one or more values of one or more fields of the second data row, and in response:

storing a second record of the second data row in the hash table, the second record comprising a third hash value representative of the third index row.

10. The non-transitory computer-readable storage medium of claim 8, wherein the first record comprises a first-level hash key, a second-level hash key, and the first hash value.

11. The non-transitory computer-readable storage medium of claim 8, wherein operations further comprise, prior to outputting the index consistency results, determining that at least one entry remains in the hash table after processing all pages of the plurality of pages, and in response:

executing a retry phase to remove the at least one entry from the hash table.

12. The non-transitory computer-readable storage medium of claim 8, wherein pages of the plurality of pages are read in allocation order as the pages are stored in computer-readable memory.

13. The non-transitory computer-readable storage medium of claim 8, wherein one of:

the index consistency results indicate that an index of the database is consistent in response to the hash table being absent entries after processing all pages in the plurality of pages; and the index consistency results indicate that an index of the database is inconsistent in response to the hash table comprising at least one entry after processing all pages in the plurality of pages.

14. The non-transitory computer-readable storage medium of claim 8, wherein the first page comprises an index page and the second page comprises a data page.

15. A system, comprising:

a computing device; and a computer-readable storage device coupled to the computing device and having instructions stored thereon which, when executed by the computing device, cause the computing device to perform operations for database consistency checks in database systems, the operations comprising:

reading a page of a plurality of pages stored in a database system, each page storing rows of data;

for a first index row of a plurality of index rows of a first page of the plurality of pages, determining that the first index row is absent from being recorded in a hash table, and in response:

storing a first record of the first index row in the hash table, the first record comprising a first hash value representative of the first index row, the first hash value being determined through hashing using an object identifier that identifies a table and an index identifier that identifies an index of the table, the first hash value pointing to a second hash value determined through hashing a page identifier based on a bucket count;

for a first data row of a plurality of data rows of a second page of the plurality of pages:

providing a second index row based on one or more values of one or more fields of the first data row, and determining that the second index row is recorded in the hash table as the first index row in the first record, and in response:

removing the first record from the hash table; and outputting index consistency results based on the hash table.

16. The system of claim 15, wherein operations further comprise:

for a second data row of a plurality of data rows of the second page:

providing a third index row based on one or more values of one or more fields of the second data row, and in response:

storing a second record of the second data row in the hash table, the second record comprising a second hash value representative of the third index row.

17. The system of claim 15, wherein the first record comprises a first-level hash key, a second-level hash key, and the first hash value.

18. The system of claim 15, wherein operations further comprise, prior to outputting the index consistency results, determining that at least one entry remains in the hash table after processing all pages of the plurality of pages, and in response:

executing a retry phase to remove the at least one entry from the hash table.

19. The system of claim 15, wherein pages of the plurality of pages are read in allocation order as the pages are stored in computer-readable memory.

20. The system of claim 15, wherein one of:

the index consistency results indicate that an index of the database is consistent in response to the hash table being absent entries after processing all pages in the plurality of pages; and the index consistency results indicate that an index of the database is inconsistent in response to the hash table comprising at least one entry after processing all pages in the plurality of pages.

\* \* \* \* \*